US010182215B1

(12) United States Patent
Jacob

(10) Patent No.: US 10,182,215 B1
(45) Date of Patent: Jan. 15, 2019

(54) SYSTEMS AND METHODS FOR REMOTE DATA COLLECTION USING UNMANNED VEHICLES

(71) Applicant: STATE FARM MUTUAL AUTOMOBILE INSURANCE COMPANY, Bloomington, IL (US)

(72) Inventor: Michael Shawn Jacob, Le Roy, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 15/810,926

(22) Filed: Nov. 13, 2017

Related U.S. Application Data

(63) Continuation of application No. 14/746,177, filed on Jun. 22, 2015.

(51) Int. Cl.
H04N 5/225 (2006.01)
H04N 7/18 (2006.01)
G06K 9/00 (2006.01)
B64C 39/02 (2006.01)
B60F 5/02 (2006.01)

(52) U.S. Cl.
CPC .............. H04N 7/185 (2013.01); B60F 5/02 (2013.01); B64C 39/024 (2013.01); G06K 9/00637 (2013.01); H04N 5/225 (2013.01); B64C 2201/066 (2013.01); B64C 2201/125 (2013.01); B64C 2201/208 (2013.01); H04N 2005/2255 (2013.01)

(58) Field of Classification Search
None
See application file for complete search history.

(56) References Cited

U.S. PATENT DOCUMENTS 4,818,990 A * 4/1989 Fernandes .............. G01R 15/14
340/12.32
5,552,983 A * 9/1996 Thornberg ............ G05D 1/0033
180/167

(Continued)

OTHER PUBLICATIONS popularmechanics.com, "How It Works: Laser Beaming Recharges UAV in Flight," (2012). Retrieved from the Internet on Sep. 22, 2015: http://www.popularmechanics.com/flight/drones/a7966/how-it-works-laser-beaming-recharges-uav-in-flight-11091133/.

(Continued)

Primary Examiner — Navid Ziaeianmehdizadeh
(74) Attorney, Agent, or Firm — Marshall, Gerstein & Borun LLP; Randall G. Rueth

(57) ABSTRACT

Systems and methods for using unassisted vehicles to assess damage in a particular location are described. According to certain aspects, the systems and methods may utilize an unmanned ground vehicle (UGV) and a plurality of unmanned aerial vehicles (UAVs). The UGV and the UAVs may be configured with various sensors to capture various damage or environmental data. The UGV and/or the UAVs may also transmit captured data to a central facility for processing. The UGV may serve as a mobile docking and recharging platform for the UAVs and may therefore extend the range and endurance of the UAVs. The UGV may be configured for remote operation, thus eliminating the need to send personnel into a potentially dangerous environment.

16 Claims, 6 Drawing Sheets

(56) References Cited

U.S. PATENT DOCUMENTS

| | | | | |
|---|---|---|---|---|
| 8,276,844 | B2* | 10/2012 | Kariv | B64F 1/06 244/110 C |
| 8,818,572 | B1* | 8/2014 | Tofte | B64C 39/024 244/75.1 |
| 8,930,044 | B1* | 1/2015 | Peeters | B64C 19/00 701/2 |
| 8,983,682 | B1* | 3/2015 | Peeters | B64C 39/024 244/190 |
| 9,051,043 | B1* | 6/2015 | Peeters | B64C 19/00 |
| 9,056,676 | B1* | 6/2015 | Wang | B64F 1/00 |
| 2004/0167682 | A1* | 8/2004 | Beck | B60K 17/046 701/3 |
| 2008/0158256 | A1* | 7/2008 | Russell | G06T 7/32 345/629 |
| 2009/0294584 | A1* | 12/2009 | Lovell | B63B 27/10 244/110 F |
| 2009/0314883 | A1* | 12/2009 | Arlton | B64C 39/024 244/63 |
| 2010/0193626 | A1* | 8/2010 | Goossen | B64C 37/00 244/2 |
| 2011/0049288 | A1* | 3/2011 | Suzuki | B64C 37/02 244/2 |
| 2011/0315810 | A1* | 12/2011 | Petrov | B64C 39/022 244/17.23 |
| 2013/0238168 | A1* | 9/2013 | Reyes | B64C 39/024 701/2 |
| 2014/0032034 | A1* | 1/2014 | Raptopoulos | G08G 5/0069 701/25 |
| 2014/0245210 | A1* | 8/2014 | Battcher | G06F 3/04842 715/771 |
| 2014/0252162 | A1* | 9/2014 | Teller | B64F 1/10 244/63 |
| 2014/0263852 | A1* | 9/2014 | Walker | B64C 39/022 244/53 R |
| 2014/0267627 | A1* | 9/2014 | Freeman | G01S 17/023 348/47 |
| 2014/0316614 | A1 | 10/2014 | Newman | |
| 2014/0319272 | A1* | 10/2014 | Casado Magana | B64F 1/04 244/110 E |
| 2014/0353422 | A1* | 12/2014 | Westbrook, Sr. | B64C 39/024 244/17.21 |
| 2015/0102154 | A1* | 4/2015 | Duncan | B64C 39/022 244/2 |
| 2015/0148988 | A1* | 5/2015 | Fleck | G05D 1/0011 701/2 |
| 2015/0158587 | A1* | 6/2015 | Patrick | B64C 39/024 244/137.4 |

OTHER PUBLICATIONS popsci.com, "Amazon's Gur Kimchi on the Future of Delivery Drones," (2015). Retrieved from the Internet on Sep. 22, 2015: http://www.popsci.com/amazons-gur-kimchi-talks-future-delivery-drones.

spectrum.ieee.org, "Is Lily a Drone? or Is It a Camera?," (2015). Retrieved from the Internet on Sep. 22, 2015: http://spectrum.ieee.org/view-from-the-valley/robotics/aerial-robots/is-lily-a-drone-or-is-it-a-camera/.

spectrum.ieee.org, "Package Delivery by Drone," (2015). Retrieved from the Internet on Sep. 22, 2015: http://spectrum.ieee.org/view-from-the-valley/robotics/aerial-robots/package-delivery-by-drone/.

tech.slashdot.org, "Automated Remote Charging for Your Flying Drones," (2014). Retrieved from the Internet on Sep. 22, 2015: http://tech.slashdot.org/story/14/06/26/1952247/automated-remote-charging-for-your-flying-drones-video.

Toksoz et al., "Automated Battery Swap and Recharge to Enable Persistent UAV Missions", *American Institute of Aeronautics and Astronautics*, 1-10 (2011).

* cited by examiner

SYSTEMS AND METHODS FOR REMOTE DATA COLLECTION USING UNMANNED VEHICLES

CROSS-REFERENCE TO RELATED APPLICATIONS

This application is a continuation of U.S. patent application Ser. No. 14/746,177, filed Jun. 22, 2015, which is hereby incorporated by reference in its entirety.

FIELD OF THE DISCLOSURE

The present disclosure generally relates to capturing data relating to property damage that may result from a catastrophe or other loss events. More particularly, the present disclosure may relate to systems and methods for capturing damage and/or environmental data in a specific location, using an unmanned ground vehicle (UGV) and a set of unmanned aerial vehicles (UAVs).

BACKGROUND

Catastrophes, disasters, or other events may occur at any time and may cause various amounts of damage to properties within or around a location of the event. Assessing damage caused by catastrophe conditions, such as manmade disasters or natural disasters (e.g., flooding, tornadoes, hurricanes, or the like) requires claims adjusters or other insurance representatives to travel to the location. However, due to the scope and/or nature of the catastrophe, travel to or within the location may be hazardous, time-consuming or even impossible for conventional vehicles. Additionally, environmental hazards such as flooding, natural gas leaks, or other hazards may prevent insurance representatives and property owners from being able to access the properties.

In some situations, certain non-emergency personnel may have to wait until government agencies determine that it is safe for the personnel to access properties after the occurrence of a catastrophic condition. This may result in a considerable delay in processing insurance claims and/or in determining the condition of the property itself, in addition to a safety issue for any individuals that may be stranded at the location.

SUMMARY

The present embodiments may, inter alia, provide for unmanned access to a location of a catastrophe or other loss events. Further, the present embodiments may enable the capture of environmental and damage data associated with the location before human access to the location is possible or allowed. Additionally, the present embodiments may process and analyze captured data to assess how to properly and efficiently address any property damage and/or unsafe conditions associated with the location.

The present embodiments may include an unmanned ground vehicle (UGV), a plurality of unmanned aerial vehicles (UAVs), a delivery vehicle, support for wireless communication, and a central monitoring system. The UGV and UAVs may be deployed to a specified location by the delivery vehicle or by other means. The UGV and the UAVs may be configured with sensors to capture damage and/or environmental data. The UGV may include processing components configured to analyze the captured data and communication components to transmit the captured data to the central monitoring system via various networks for processing.

In one embodiment, a system for capturing environmental data in a specified location may be provided. The system may include a plurality of unmanned aerial vehicles (UAVs) each configured for airborne flight in proximity to the specified location. Each UAV may include an imaging sensor configured to capture a set of digital images while in airborne flight in proximity to the specified location, a UAV memory configured to store the set of digital images captured by the imaging sensor, and a battery component configured to power operation of the corresponding UAV. The system may further include an unmanned ground vehicle (UGV) configured for travel in proximity to the specified location. The UGV may include a set of sensors configured to capture a set of sensor data in an area surrounding the UGV, a UGV memory configured to store data including at least the set of sensor data, at least one docking component configured to secure at least one of the plurality of UAVs, a battery powering component configured to supply power, via the at least one docking component, to the respective battery components of the plurality of UAVs, and a data transmission interface configured to enable transfer of the set of digital images from the plurality of UAVs for storage on the UGV memory.

In another embodiment, an unmanned ground vehicle (UGV) configured for travel in a specified location and configured to capture environmental data associated with the specified location is provided. The UGV may include a set of sensors configured to capture a set of sensor data in an area surrounding the UGV, a memory configured to store data including at least the set of sensor data, at least one docking component configured to secure a plurality of unmanned aerial vehicles (UAVs), a battery powering component configured to supply power, via the at least one docking component, to respective battery components of the plurality of UAVs, and a data transmission interface configured to enable transfer of a set of digital images from the plurality of UAVs for storage on the memory.

In a further embodiment, a computer-implemented method of capturing environmental data by an unmanned ground vehicle (UGV) in a specified location is provided. The method may include capturing, by a set of sensors, a set of sensor data in an area surrounding the UGV, securing, via at least one docking component, a plurality of unmanned aerial vehicles (UAVs) to the UGV, supplying power, via the at least one docking component, to respective battery components of the plurality of UAVs, receiving, via a data transmission interface, a set of digital images from the plurality of UAVs, and storing, in memory, the set of sensor data and the set of digital images.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

The novel methods and systems disclosed herein generally relate to techniques and implementations for extending the reach and endurance of unmanned aerial vehicles (UAVs) that may be used to collect real-time imaging data and environmental data, primarily in, but not limited to, catastrophe situations. The UAVs may be any unmanned aerial vehicles capable of vertical take-off and landing as well as airborne flight. The UAVs may be configured to capture imaging data and other sensory data, such as temperature, barometric pressure, and presence of dangerous chemicals such as chlorine, carbon monoxide, and natural gas. According to aspects, an unmanned ground vehicle (UGV) may be utilized to provide a highly accessible and stable platform for storing sensor data that may be remotely collected (e.g., sensor data from the UAVs and/or sensor data from any sensors of the UGV) and for docking/charging the UAVs. The UGV may also be configured to transmit data through a public or private telecommunications network to a back-end entity or other remote location where the data may be analyzed. The UGV may be capable of travel in situations that may be hazardous or difficult to access, such as rough terrain, chemical spills, and/or the like. The UGV may also be configured to deliver supplies to field claim representatives or emergency personnel who may be in the area.

The present embodiments offer several advantages and benefits over conventional methods of collecting damage data and processing any resulting insurance claims in certain loss event situations. In particular, conventional procedures require an insurance agent or claims representative to physically travel to a location impacted by a loss event and take pictures, take measurements, and/or collect other data. A loss event situation may result in impassable roads and/or obstructions that would impede or prevent travel by conventional manned vehicles. There also may be hazardous conditions that could threaten the safety of field personnel. Additionally, conventional UAVs may not have sufficient range or endurance to gather adequate data in these locations.

The present embodiments utilize the UGV as an all-terrain mobile platform for docking and charging one or more UAVs, and for storing sensor data collected by the UAVs. The UGV may resolve the range and endurance limitations of the UAVs by transporting the UAV(s) to the immediate loss event location. The UGV may also enable remote capture of ground-sensed environmental data which may not be safe for field personnel to capture (and also may not be captured by the UAVs). The UGV further provides a way for various sensory data to be collected without exposing field personnel to potential hazards in a catastrophe situation. The UGV may also be configured to deliver supplies to field claim representatives in the area, and/or to transport personnel if necessary.

Figure 1:
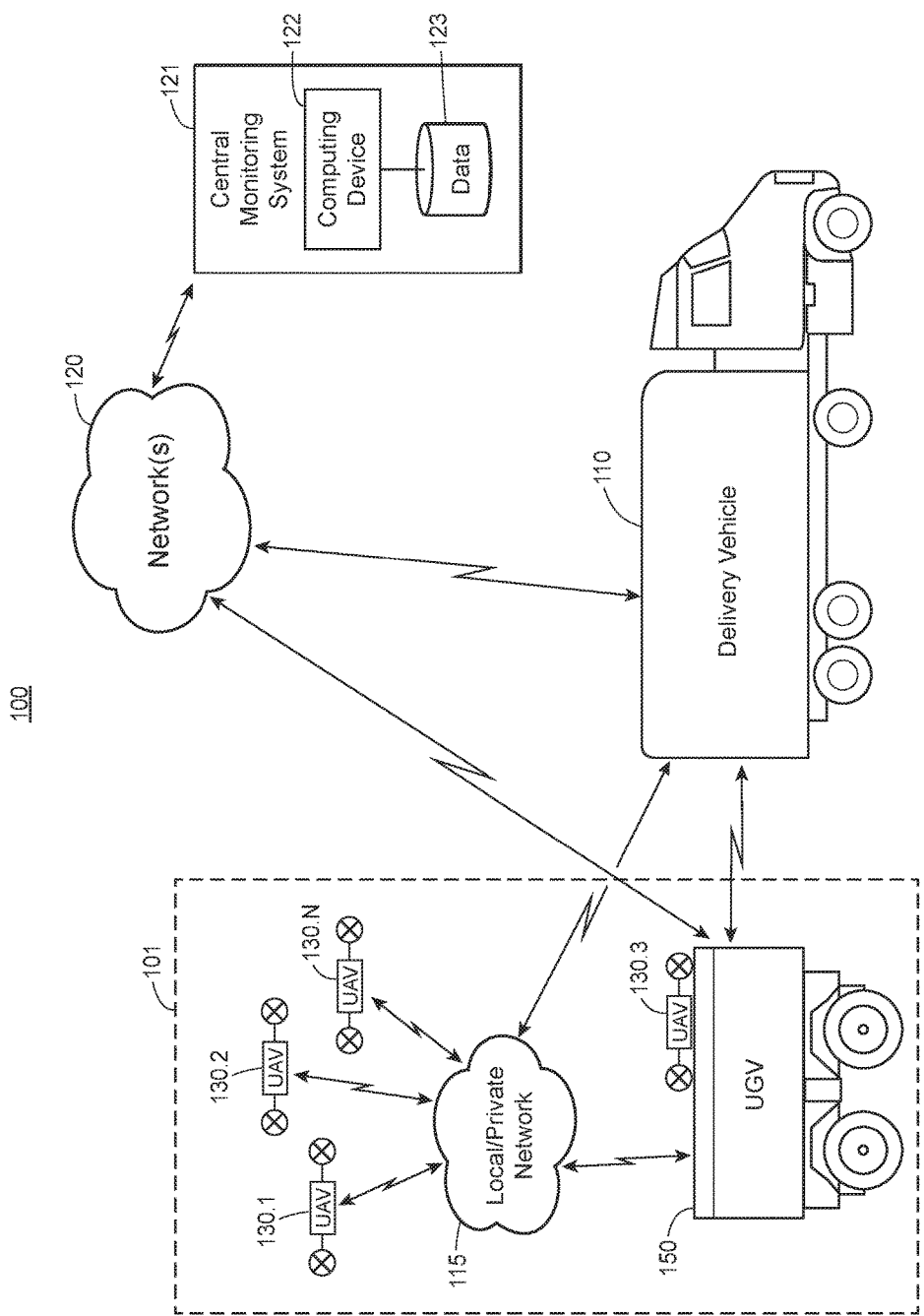
FIG. 1 illustrates a block diagram of an example system for capturing environmental data in a specific location, using a UGV and one or more UAVs, in accordance with some embodiments.

FIG. 1 illustrates various aspects of an exemplary system 100 that may be configured to capture various environmental data in a specified location. As depicted in FIG. 1, the system 100 may include a delivery vehicle 110 which may be used to deliver a UGV 150 to a specified area 101. The UGV 150 may serve as a mobile launching, docking, and/or charging platform for one or more UAVs 130.1-130.N. The system 100 further includes a central monitoring system 121. As depicted in FIG. 1, the central monitoring system 121, the UGV 150, and the UAVs 130.1-130.N may communicate between and among each other via one or more networks 115 and/or 120. Each of the networks 115 or 120 may support any type of data communication via any standard or proprietary technology (e.g., GSM, CDMA, TDMA, WCDMA, LTE, EDGE, OFDM, GPRS, EV-DO, UWB, IEEE 802 including Ethernet, WiMAX, Wi-Fi, Bluetooth, and others). In some implementations, users may interface with any of the central monitoring system 121, the delivery vehicle 110, the UGV 150, or the UAVs 130.1-130.N.

As exemplified in FIG. 1, the delivery vehicle 110 may be configured to transport the UGV 150 to the specified area or location 101. It should be appreciated that the UGV 150 may be transported by other means without the need of the delivery vehicle 110, and may be capable of being driven or operated by a driver or operator (or, in some cases, operated autonomously by onboard computers). The delivery vehicle 110 may be any type of vehicle configured for transport. For example, the delivery vehicle 110 may be a rental vehicle, a privately- or company-owned stock or customized vehicle, and/or the like. The delivery vehicle 110 may include various hardware and software components such as communications equipment, sensory equipment, and/or control equipment. In some implementations, various hardware and software components may be configured to control the UGV 150 and/or the UAVs 130. Additionally, the delivery vehicle 110 may include repair facilities for the UGV 150 and/or UAVs 130.

Referring to FIG. 1, the UGV 150 may be any kind of unmanned vehicle capable of movement within and/or traversal of the specified area 101. For example, the UGV 150 may include any number of wheels or treads or skis or combination thereof, or may be in the form of a hovercraft, capable of travelling over water and/or landing on water or land. The UGV 150 may be powered, for example, by an internal combustion engine (which may be fueled by gasoline, diesel fuel, propane, or other combustible substance) and/or by batteries (which may be recharged by optional solar cells on the UGV 150) or by a hybrid of an internal combustion engine and batteries.

Although the UGV 150 is primarily intended to be unmanned, it may include a provision for transporting at least one person, and it may include controls to enable an on-board person to operate the UGV 150. The UGV 150 may be operated remotely by an individual located remote from the specified area 101 such as at a back-end entity (e.g., at the central monitoring system 121), in the delivery vehicle 110, in a manned aircraft, or from a portable remote control device carried or pushed or pulled by an operator. In some implementations, the UGV 150 may be operated autonomously by one or more onboard computers.

The UGV 150 may be configured with various sensors to detect various environmental factors and data such as, for example, ambient temperature, barometric pressure, wind speed and direction, combustible or otherwise dangerous gasses (such as natural gas, LP gas, hydrogen, radon, chlorine, and/or the like), radioactivity levels, UV radiation, and/or other potentially dangerous environmental factors and data.

According to embodiments, the UGV 150 may be configured to accommodate the one or more UAVs 130. Accordingly, the UGV 150 may transport the UAVs 130 to the specified area 101. The UAVs 130 may be any unmanned vehicle (sometimes referred to as "drones") capable of air travel and vertical take-off and landing on any surface, including any hard terrain or water. In some implementations, the UAVs 130 may be propelled by one or more propellers or any other available method of propulsion. The UAVs 130 may be powered by batteries or any other available energy source. In operation, the UGV 150 may be configured to extend the endurance capability of the UAVs 130 by providing a mobile platform for recharging and/or exchanging batteries of the UAVs 130.

Similar to the UGV 150, each of the UAVs 130 may be configured with various sensors to detect environmental factors or data such as ambient temperature, barometric pressure, wind speed and direction, combustible or otherwise dangerous gasses (such as natural gas, LP gas, hydrogen, radon, chlorine, and/or the like), radioactivity levels, UV radiation, and/or other potentially dangerous environmental factors or data. The UAVs 130 may be configured to transmit any detected sensory and/or flight data in real-time through the network(s) 115 and/or 120 to the delivery vehicle 110, to the UGV 150, and/or to the central monitoring system 121. The UAVs 130 may also be configured to store sensory and/or flight data onboard. Accordingly, when the UAVs 130 are docked on the UGV 150, the UAVs 130 may transmit the stored sensory data and/or flight date to the UGV 150. The UAVs 130 may be operated remotely through dedicated private radio communications with the delivery vehicle 110, the UGV 150, and/or a portable remote control device associated with an operator. The UAVs 130 may also be operated remotely from the central monitoring system 121 via the network(s) 120 or controlled autonomously by computers.

As discussed above, the networks 115 and/or 120 may facilitate communication among the delivery vehicle 110, the UGV 150, the UAVs 130, and the central monitoring system 121. In particular, the networks 115 and/or 120 may facilitate the communication of imaging data (both recorded and streamed), voice communications, sensory data, travel/flight data, and other electronic data. The delivery vehicle 110, the UGV 150, and/or the UAVs 130 may also communicate among each other via dedicated frequencies that are not part of a network. As an example, the delivery vehicle 110 may receive sensory data and streaming digital images collected by the UGV 150 and/or the UAVs 130 on location in the specified area 101. As another example, the UGV 150 may collect sensory data and streaming imaging data from the sensors and camera(s) on the UGV 150 and/or from the UAVs 130 on location in the specified area 101.

The UGV 150 may store the data onboard or may transmit the data via the network(s) 120 to the delivery vehicle 110 and/or to the central monitoring system 121. In some implementations, the UAVs 130 may communicate with the UGV 150 and/or directly with the delivery vehicle 110 via the network(s) 115, 120. By communicating through the network(s) 120, the UAVs 130 may transmit sensory data and other data directly to the central monitoring system 121, thereby reducing delays in transmitting potential critical data for analysis. The central monitoring system 121 may include various computing device(s) 122, data storage unit(s) 123, and/or any other equipment necessary to receive and process data received from the UGV 150, the UAVs 130, and/or the delivery vehicle 110. Additionally, the components of the central monitoring system 121 may also be configured to send data or instructions to equipment and/or personnel located in the specified area 101.

Figure 2A:
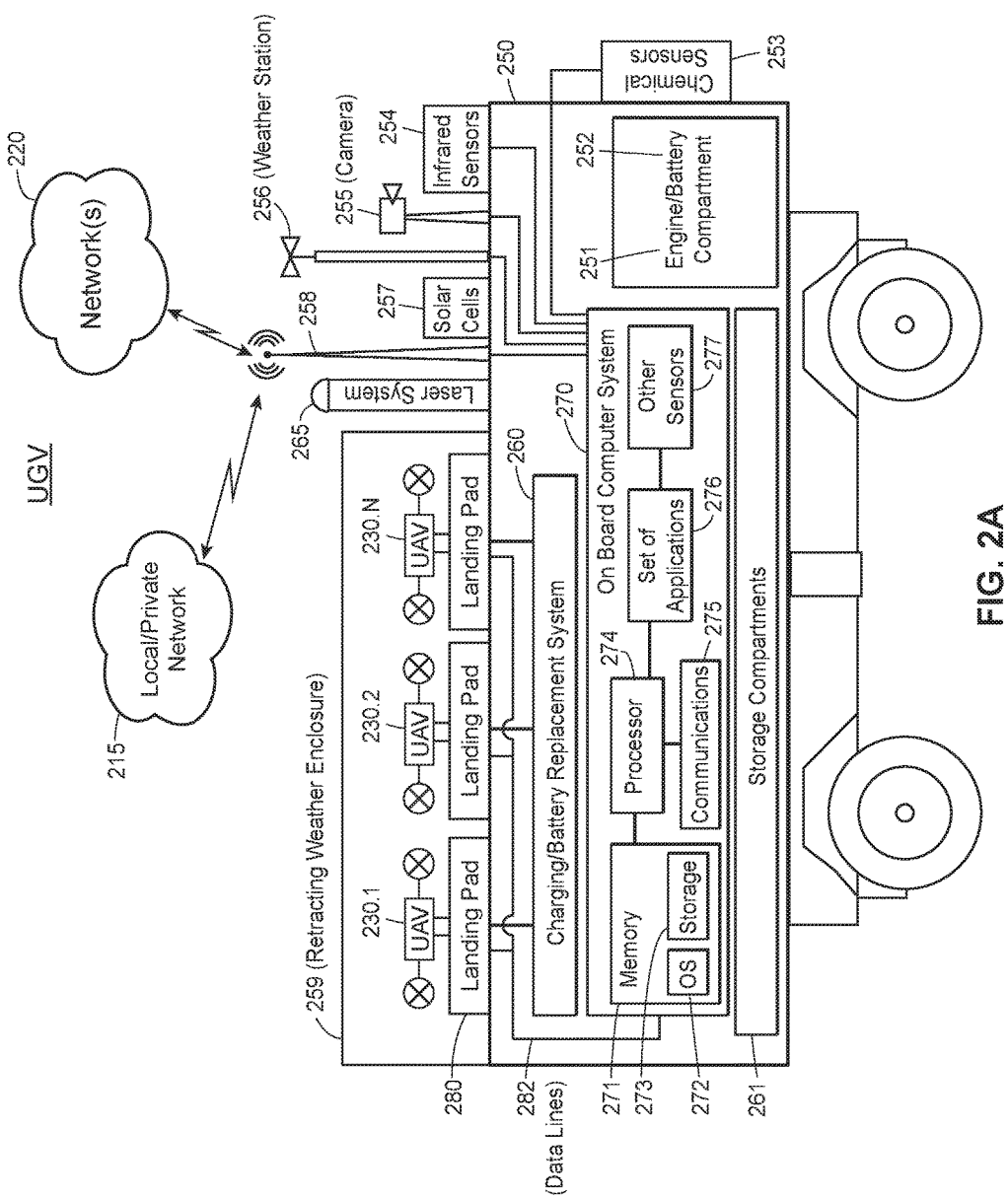
FIG. 2A illustrates a block diagram of an example UGV in accordance with some embodiments.

FIG. 2A illustrates a more detailed schematic of a UGV 250 (such as the UGV 150 discussed with respect to FIG. 1). The UGV 250 may be configured to secure, dock, and/or launch a set of UAVs 230 (such as the UAVs 130 discussed with respect to FIG. 1). Although FIG. 2A depicts three (3) UAVs 230, it should be appreciated that fewer or more UAVs 230 are envisioned. Furthermore, there also may be fewer or more than three (3) UAVs 230 docked on the UGV 250 (or in the air) at any given time.

As depicted in FIG. 2A, the UGV 250 may include various software and hardware components that may facilitate the embodiments described herein. In some implementations, the UGV 250 may be configured with a retracting weather enclosure 259 to protect the UAVs 230 from hostile or damaging environmental conditions while docked on the UGV 250. The UGV 250 may also include one or more landing pads 280 that may be configured to secure and release the UAVs 230 as needed. The landing pad 280 may be configured to download various data (e.g., sensor data) from the UAV 230, recharge the battery or replace the battery of the corresponding UAV 230, and/or secure the UAV 230 while the UAV 230 is being transported on the UGV 250. The landing pad 280 may also be configured with a charging/battery replacement system 260, which may charge the battery on the UAV 230 and/or automatically replace the battery with a charged battery.

The landing pad 280 (which will be exemplified in more detail in FIG. 2B) may be configured with one or more data lines 282 to transmit data from the UAV 230 to an onboard computer system 270 of the UGV 250 and/or to transmit data from the onboard computer system 270 to the UAV(s) 230. In some implementations, the data from the UAV 230 may be transmitted or received via a communication module 275 of the onboard computer system 270 and an antenna 258 of the UGV 250. The antenna 258 may be configured to transmit and receive digital and/or analog data via commercially available cellular communications, local/private frequencies, shortwave, or other available wireless communications systems.

Generally, the onboard computer system 270 may control various operation of the UGV 250, communicate with the UAVs 230, and store imaging data and other sensory data detected by the UAVs 230 and any sensory equipment on the UGV 250. The onboard computer system 270 may include a memory module 271 (that may include an operating system 272 and data storage device(s) 273), a processor 274, the communication module 275, a set of applications 276, and hardware and software support for other sensors 277. Through the communication module 275, the UGV 250 may be capable of providing a Wi-Fi hotspot, which may be used by emergency personnel to communicate from the site, such as when local wireless communications are disrupted. Each of the UGV 250 and the UAVs 230 may be configured with digital imaging hardware and software, and/or other sensory equipment. Further, each of the UGV 250 and the UAVs 230 may communicate travel/flight instructions to each other, as well as imaging data and sensory data.

The UGV 250 may further be configured with one or more storage compartments 261 capable of storing emergency supplies (such as food or water or medical supplies) and equipment (such as tablets or laptops) to the site. The engine compartment may be configured with an internal combustion engine 251 (e.g., diesel, gasoline, propane, etc.), rechargeable batteries 252, or both. The rechargeable batteries 252 may be recharged by an alternator on the engine 251 or by solar cells 257 mounted on the UGV 250.

As illustrated in FIG. 2A, the UGV 250 may be configured with other external devices such as a camera 255, a weather station 256, and a communications antenna 258. The camera 255 may be configured to capture digital imaging data such as still photos and/or video at commercially available frame rates and resolution quality. The weather station 256 may include equipment for determining ambient (atmospheric) temperature and/or temperature of objects or substances contacted by a probe that may be extended from the UGV 250. The weather station 256 may also include equipment for measuring wind speed and/or direction, barometric pressure, and/or other weather factors as needed. The communications antenna 258 may be configured to transmit and receive signals/data between the UGV 250 and the UAVs 230, and a network 215, 220 (such as the networks 115 and 120 as discussed with respect to FIG. 1).

The UGV 250 may also be configured with equipment to charge batteries, such as the solar cells 257 and a laser charging system 265. The solar cells 257 may be configured to charge the battery(ies) of the UGV 250 and/or any batteries of the UAVs 230. The laser charging system 265 may be configured to beam energy to a photovoltaic panel mounted underneath the UAVs 230 and accordingly recharge the battery(ies) of the UAVs 230. The laser charging system 265 may reduce or eliminate the need for the UAVs 230 to land to recharge batteries, and the laser charging system 265 may thus further extend the endurance of the UAVs 230.

Still referring to FIG. 2A, the UGV 250 may include chemical sensors 253 for detecting potentially dangerous or harmful substances and infrared sensors 254 for detecting heat sources. It should be appreciated that other sensors may be included, such as sensors for detecting and/or measuring radioactivity, radon, UV, X-rays, and/or the like. The chemical sensors 253 may be configured to detect chemicals in liquid form, such as gasoline, diesel fuel, crude oil, etc., and/or gas form, such as chlorine, ammonia, or other substances. The infrared sensors 254 may be configured to detect heat from animals and/or people and/or from inanimate heat sources, such as fire.

Figure 2B:
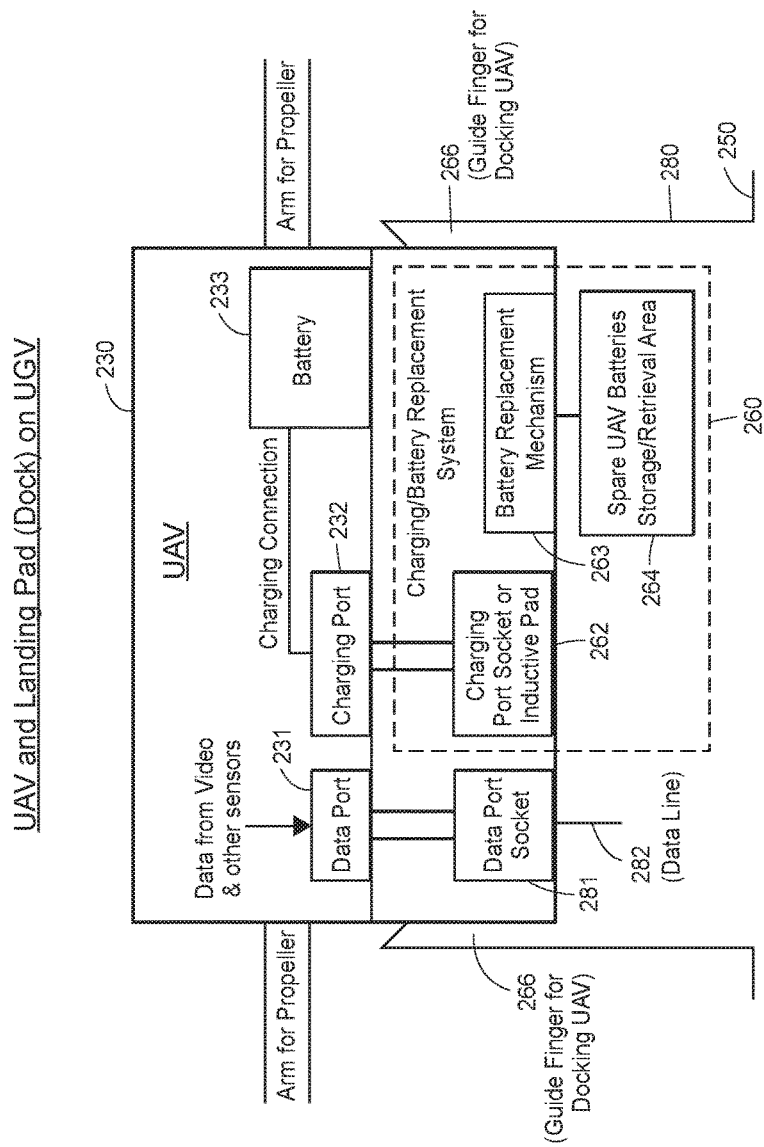
FIG. 2B illustrates a block diagram detailing a landing pad/docking station and battery replacement mechanism that enables docking and data transmission capabilities between the UGV and the UAVs, in accordance with some embodiments.

FIG. 2B is a more detailed view of a UAV 230 (such as one of the UAV(s) 130 as discussed with respect to FIG. 1) that may be secured to the UGV 250. In particular, the UAV 230 may be secured to the UGV 250 via the landing pad 280, as discussed above. When the UAV 230 lands (i.e., docks) on the landing pad 280, the UAV 230 may be guided into position by guide fingers 266. The UAV 230 may be secured by a latching or clamping mechanism and/or by magnetic contacts and/or by a cage or cover. The landing pad 280 may be configured to charge a battery 233 in the UAV 230 and/or replace the battery 233.

As depicted in FIG. 2B, the UGV 250 may include the charging/battery replacement system 260 that may be a part of the landing pad 280. The charging/battery replacement system 260 may include a charging port socket (or an inductive charging pad) 262, a battery replacement mechanism 263, and a spare battery storage/retrieval area 264. The charging port socket (or inductive charging pad) 262 on the landing pad 280 may physically connect with or make contact with the charging port 232 on the UAV 230. The battery 233 may be charged or replaced depending on the length of time before the UAV 230 is required to be airborne. The energy source for charging the battery 233 may be any of a combination of components depicted in FIG. 2A, such as the UGV 250 battery(ies) 252, an alternator on the UGV engine 251, or from the solar cells 257.

In some implementations, the battery replacement mechanism 263 on the landing pad 280 may be configured to replace the battery 233 by releasing the battery 233 from the UAV 230, removing the battery 233 from the UAV 230, and sliding and/or inserting a new/charged battery 233 into the UAV 230. The battery replacement mechanism 263 may remove the battery 233 in a manner similar, but not limited, to the way that battery packs are changed on cordless drills or other cordless tools and/or devices. Alternatively, the battery replacement mechanism 263 may be configured to slide the battery 233 in or out of the UAV 230. The charging/battery replacement system 260 may include an indexing system to remove and store used batteries and to make new/charged batteries available to the UAVs 230 as needed. The indexing system may be a vertical stack, a horizontal storage system, a rotary storage system, and/or other configuration. In some implementations, each landing pad 280 may include the charging/battery replacement system 260. In other implementations, certain specified landing pads 280 may include the charging/battery replacement system 260. Some landing pads 280 may be configured to charge batteries 233, while other landing pads 280 may be configured to secure the UAVs 230.

Still referring to FIG. 2B, wired data communications between the UGV 250 and the UAV 230 may be implemented via a connection between a data port socket 281 on the landing pad 280 of the UGV 250 and the data port 231 on the UAV 230. The data port socket 281 may be connected to the onboard computer system 270 of the UGV 250 via the data line 282, which was depicted in FIG. 2A. The data port socket 281 and the data port 231 may be configured to transmit data or instructions from the UGV 250 to the UAV 230 and/or to transmit imaging data or other sensory data from the UAV 230 to the UGV 250. Examples of the transmission connection channels and protocols may be Ethernet, USB, Bluetooth, WiMAX, Wi-Fi, or other data transfer methods.

Figure 3:
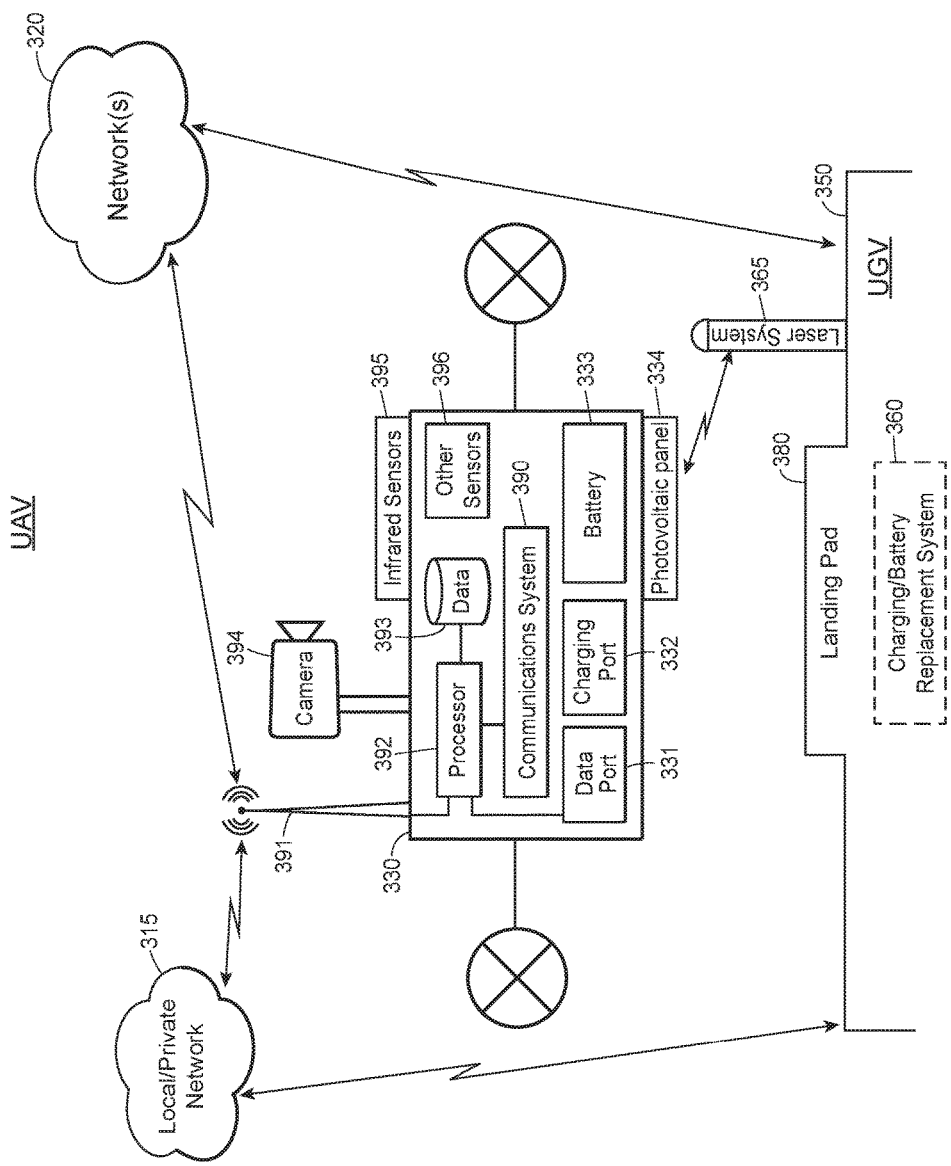
FIG. 3 depicts a block diagram of the UAV in accordance with some embodiments.

FIG. 3 illustrates an exemplary block diagram of a UAV 330 (such as the UAV(s) 130 discussed with respect to FIG. 1 and the UAV(s) 230 discussed with respect to FIG. 2A and FIG. 2B). The UAV 330 may be a drone configured for aerial assessment of damage and/or hazards during or after a loss event, or in other circumstances. The UAV 330 may be docked and charged at a back end location (e.g., the central monitoring system 121) or at a specific remote location where claim damage data is being captured. When deployed at a remote location, the UAV 330 may be docked on a UGV 350 (such as the UGV 150 discussed with respect to FIG. 1 and the UGV 250 discussed with respect to FIG. 2A and FIG. 2B). The UAV 330 may also be configured for swarming with other UAVs 330 that may be associated with the UGV 350 (and/or with other UGVs 350 that may be in the area).

Referring to FIG. 3, the UAV 330 may be configured with hardware and software necessary to capture digital imaging and other sensory data. The UAV 330 may be configured to include a camera 394, infrared sensors 395 for detecting heat sources, and other sensors 396. The camera 394 may be any commercially available digital imaging camera or custom camera, configured to capture digital imaging data such as photos and/or video at commercially available frame rates and resolution quality. It should be appreciated that the UAV 330 may include other sensors such as sensors for detecting and/or measuring chemicals, radioactivity, radon, UV, X-rays, and/or the like. The UAV 330 may process flight data and/or sensor data and be controlled by a processor 392 that may interface with a data storage device 393. The data storage device 393 may store control data for the UAV 330 and may store imaging data and other sensory data. The data storage device 393 may be a permanent part of the UAV 330 (e.g., RAM chip(s) or a solid state drive (SSD)), or it may be a detachable device, such as a flash drive, for example.

The UAV 330 may be configured to communicate with the UGV 350 and/or a network 315 and/or a network(s) 320 in order to transmit flight data and/or sensor data. The UAV 330 may include a communications system 390 and an antenna 391 for communication with the UGV 350. The communications system 390 may transmit and receive radio signals through the antenna 391 to communicate with other devices through the local/private wireless network 315 that may have a more limited range and distribution than a broadly distributed network. The communications system 390 may also transmit and receive radio signals through the antenna 391 to communicate with other devices through the network(s) 320, which may be a public switched network or other broadly distributed network. The communications system 390 may communicate in a wired configuration with the UGV 350 through a data port 331 on the UAV 330.

The UAV 330 may further include a charging port 332 for interfacing with a landing pad 380 on the UGV 350. (The landing pad 380 may be the same as the landing pad 280 discussed with respect to FIG. 2A and FIG. 2B.) The UAV 330 may include one or more power sources such as one or more batteries 333 (such as the battery 233 discussed with respect to FIG. 2B), rechargeable or otherwise, or a combustible fuel for an internal combustion engine. The battery 333 may be recharged or replaced, depending in some situations on how soon the UAV 330 needs to be airborne. The battery 333 may be recharged through the charging port 332. The battery 333 on the UAV 330 may also be recharged by a laser beam while the UAV 330 is in flight, such that the UAV 330 does not need to land on the UGV 350 to have the battery 333 recharged or replaced. The laser beam may be aimed at a photovoltaic panel 334 on the underside of the UAV 330, where the photovoltaic panel 334 may convert the light energy to electrical energy to recharge the battery 333. A mobile laser system 365 (such as the laser system 265 discussed with respect to FIG. 2A) that may be located on the UGV 350 may generate the laser beam, or a ground-based laser system may generate the laser beam. In addition to the battery charging system, an automated charging/battery replacement system 360 (such as the charging/battery replacement system 260 discussed with respect to FIGS. 2A and 2B) may be configured to replace the battery 333.

Figure 4:
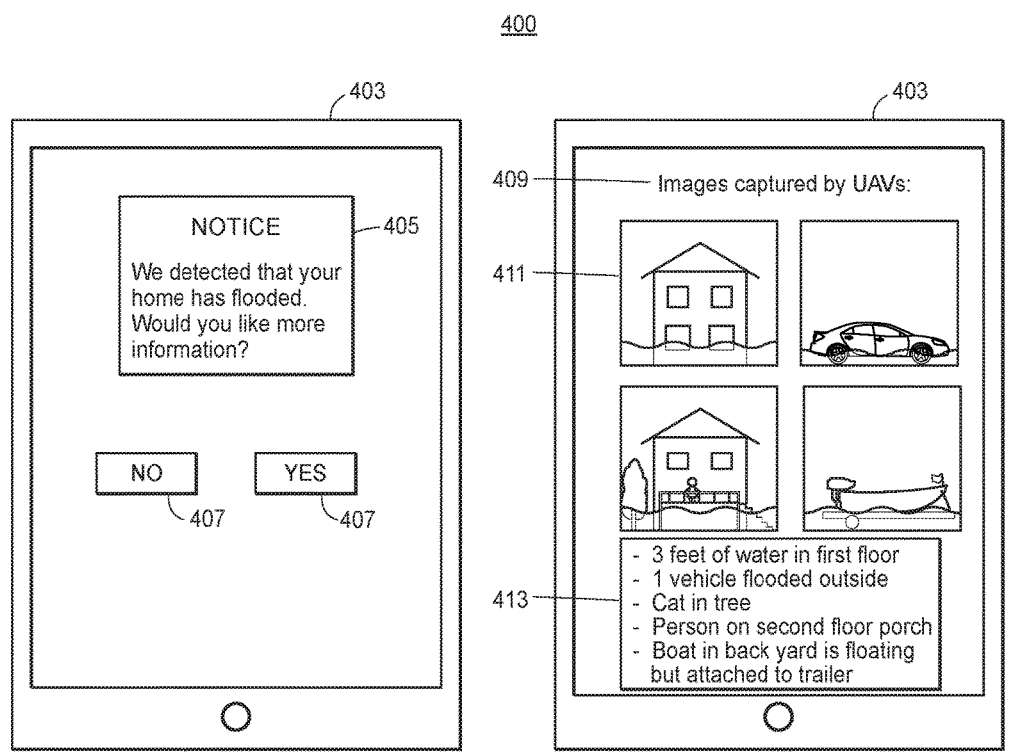
FIG. 4 illustrates exemplary interface screens associated with various insurance processing functionalities, in accordance with some embodiments.

FIG. 4 illustrates exemplary interfaces associated with presenting various digital data and associated functionalities with the digital data. An electronic device 403 (e.g., a mobile device such as a smartphone) may be configured to display the interfaces. The interfaces may relate to various insurance policy processing between an insurance provider and the insured party or policyholder, who may be a user of the electronic device. For example, a dedicated application associated with a user and/or with the user's property may be configured to display the interfaces. In a loss event situation, an insurance provider may deploy one or more UAVs and/or UGVs to a specific location to capture environment data. After the UAVs and/or UGVs capture the data and the insurance provider analyzes the data, the insurance provider may send a notice to the user regarding the damage and query whether the user would like more information. If the user responds with a request for more information, the insurance provider may transmit text and/or digital images to the electronic device and the electronic device may display the text and/or digital images. It should be appreciated that the interfaces are merely exemplary and that alternative or additional content is envisioned.

As depicted in FIG. 4, after an insurance provider receives and processes any damage data that is captured by the UAVs and/or UGVs, the insurance provider may send a notice 405 to the electronic device 403. The notice 405 may indicate that the user's property was damaged and may provide a high-level description of the damage. The interface may request that the client select whether further information is desired via a response 407 (as shown: a "Yes" or "No" soft key). If the client selects "Yes", the insurance provider may send more detailed information regarding the damage to the electronic device 403.

Still referring to FIG. 4, an exemplary interface 409 may describe the status and/or damage to the property via a set of digital images 411 and/or text 413. As depicted in FIG. 4, the digital images 411 may include images of a flooded house, a flooded vehicle, a person stranded on a second floor balcony, and a boat floating in the back yard. The text 413 may describe what is depicted in the images and/or may provide additional information on the status of the property or surrounding area. The interface 409 may further include contact information to enable the user to follow up regarding the information provided.

Figure 5:
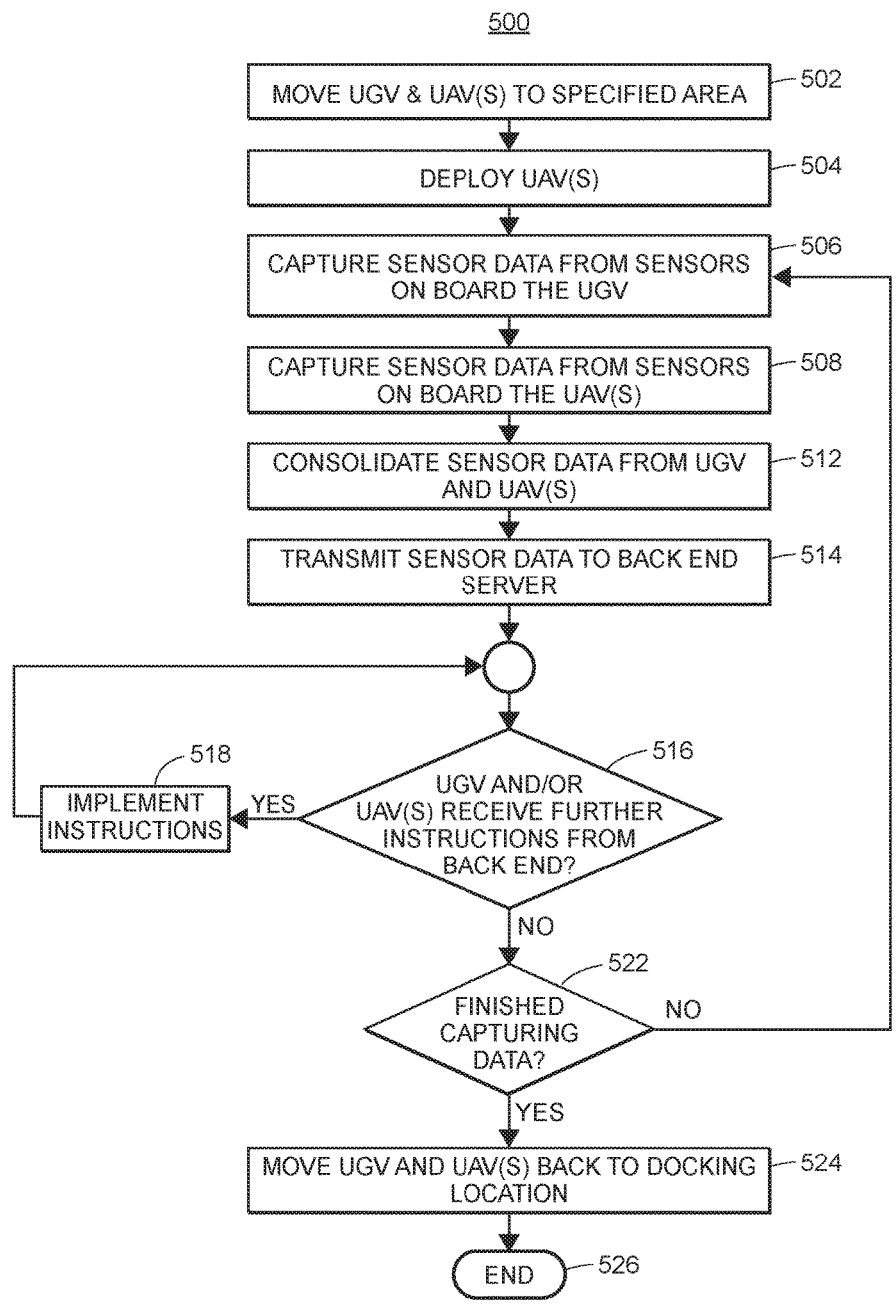
FIG. 5 depicts a flow diagram for capturing relevant data for damage assessment in accordance with some embodiments.

FIG. 5 exemplifies a process flow diagram 500 for capturing and analyzing relevant data for the damage assessment functionalities described herein. In certain situations, a loss event may occur where there is damage to one or more properties. An insurance provider may want to capture data to determine the extent of the damage and process any potential insurance claim filings. The process flow diagram 500 may be performed by a combination of one or more UAVs and/or a UGV, which may be deployed to a specified area associated with the loss event.

This first step in the process flow diagram 500 is illustrated in block 502 in which the UGV and the UAV(s) may be moved to the specified area. After the UAVs and/or the UGV are in the specified area, the UGV may deploy the UAVs (block 504) to capture data while airborne. The UGV may then capture sensor data from various sensors on board the UGV (block 506). According to embodiments, the UGV may store the captured sensor data locally. Further, the UAVs may also begin capturing sensor data using various sensors on board the UAVs (block 508). After capturing the sensor data, the UAVs may transmit the captured sensor data to the UGV. Computers on board the UGV may consolidate the sensor data captured by the UGV and the sensor data captured by the UAVs (block 512). The UGV may then transmit the sensor data to a back end server, where the back end server may analyze the data and facilitate any actions accordingly (block 514). In some implementations, an onboard computer of the UGV may analyze the sensor data and perform any actions accordingly.

The UGV and/or the UAVs may receive further instructions from computers and/or personnel associated with the back end server (block 516). For example, the instructions from the back end server may include commands to relocate to specified coordinates to capture additional sensory data, commands to recalibrate certain sensors, and/or commands to secure the UAVs and/or evacuate the area due to incoming severe weather. The UGV and/or UAVs may then execute the instructions (block 518) and wait for any further instructions.

In some implementations, if the UGV and/or the UAVs do not receive further instructions, the UGV and/or the UAVs may query (block 522) the back end server to determine whether the UGV and/or the UAVs should be finished capturing data. For example, personnel associated with the back end server may determine that certain data may be missing or incomplete, and may request for the incomplete or missing data to be collected.

If the UGV and/or the UAVs are not finished capturing data ("No"), processing may proceed back to block 506, in which the UGV and/or the UAVs may begin capturing additional data. If the UGV and/or the UAVs are finished capturing data ("YES"), the UGV and/or the UAVs may relocate to a home docking location or to another location (block 524), or may otherwise cease collecting data. The process flow diagram 500 may then end at block 526.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, the patent claims at the end of this patent application are not intended to be construed under 35 U.S.C. § 112(f) unless traditional means-plus-function language is expressly recited, such as "means for" or "step for" language being explicitly recited in the claim(s).

Further, any reference to "home" or "property" is meant to be exemplary and not limiting. The systems and methods described herein may be applied to any property, such as offices, farms, lots, parks, and/or other types of properties or buildings. Accordingly, "homeowner" may be used interchangeably with "property owner."

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For instance, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For instance, where the hardware modules comprise a general-purpose processor configured using software, the general-purpose processor may be configured as respective different hardware modules at different times. Software may accordingly configure a processor, for instance, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for instance, through the storage and retrieval of information in memory structures to which the multiple hardware modules have access. For instance, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor-implemented. For instance, at least some of the operations of a method may be performed by one or more processors or processor-implemented hardware modules. The performance of certain of the operations may be distributed among the one or more processors, not only residing within a single machine, but deployed across a number of machines. In some exemplary embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to home or personal property insurance policies, it should be appreciated that an insurance provider may offer or provide one or more different types of insurance policies. Other types of insurance policies may include, for instance, condominium owner insurance, renter's insurance, life insurance (e.g., whole-life, universal, variable, term), health insurance, disability insurance, long-term care insurance, annuities, business insurance (e.g., property, liability, commercial auto, workers compensation, professional and specialty liability, inland marine and mobile property, surety and fidelity bonds), automobile insurance, boat insurance, insurance for catastrophic events such as flood, fire, volcano damage and the like, motorcycle insurance, farm and ranch insurance, personal liability insurance, personal umbrella insurance, community organization insurance (e.g., for associations, religious organizations, cooperatives), personal articles, and/or other types of insurance products. In embodiments as described herein, the insurance providers process claims related to insurance policies that cover one or more properties (e.g., homes, automobiles, personal property), although processing other insurance policies is also envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

As used herein, the terms "comprises," "comprising," "includes," "including," "has," "having" or any other variation thereof, are intended to cover a non-exclusive inclusion. For instance, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For instance, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A system for capturing environmental data in a specified location, the system comprising:
   a plurality of unmanned aerial vehicles (UAVs) each configured for airborne flight in proximity to a property at the specified location and each comprising:
      an imaging sensor configured to capture a set of digital images while in airborne flight in proximity to the property at the specified location, and
      a UAV memory configured to store the set of digital images captured by the imaging sensor;
   an unmanned ground vehicle (UGV) configured for travel in proximity to the specified location, interfacing with a remote server via a communication network, and configured to:
      receive the set of digital images from the plurality of UAVs,
      receive, from the remote server via the communication network, a set of commands associated with control of the plurality of UAVs,
      transmit, to the remote server via the communication network, the set of digital images and a set of sensor data comprising at least one of: temperature data, pressure data, wind data, gas data, radioactivity data, and radiation data, the remote server configured to analyze the set of digital images to determine damage to the property as depicted in the set of digital images,
      wait for further instructions to capture additional data, and
      in response to not receiving the further instructions to capture additional data, query the remote server via the communication network to determine whether at least one of the plurality of UAVs and the UGV should capture the additional data based on the transmitted set of digital images and the set of sensor data; and
   an electronic device comprising an interface and a processor, wherein the processor is configured to:
      receive, from the remote server, at least a portion of the set of digital images that were analyzed by the remote server, and
      cause the interface to concurrently display (i) the portion of the set of digital images, and (ii) for each digital image in the portion of the set of digital images, a textual description of the damage to the property determined by the remote server.

2. The system of claim 1, wherein each of the plurality of unmanned aerial vehicles (UAVs) further comprises:
   a battery configured to power operation of the corresponding UAV.

3. The system of claim 2, wherein the unmanned ground vehicle (UGV) further comprises:
   a docking component platform configured to secure at least one of the plurality of unmanned aerial vehicles (UAVs).

4. The system of claim 3, wherein the unmanned ground vehicle (UGV) further comprises:
   an additional battery configured to supply power, via the docking platform, to the respective batteries of the plurality of unmanned aerial vehicles (UAVs).

5. The system of claim 4, wherein the additional battery is configured to recharge the respective batteries of the plurality of unmanned air vehicles (UAVs).

6. The system of claim 1, wherein the unmanned ground vehicle (UGV) further comprises:
   a set of solar cells configured to use solar energy to power the UGV.

7. The system of claim 1, wherein the unmanned ground vehicle (UGV) further comprises:
   a set of sensors configured to capture the set of sensor data in an area surrounding the UGV.

8. The system of claim 7, wherein the set of sensors of the unmanned ground vehicle (UGV) includes at least one of: a set of chemical sensors configured to detect various chemicals, a set of infrared sensors configured to detect one or more heat sources, a UGV imaging sensor configured to capture imaging data, and a set of weather sensors configured to detect weather parameters.

9. The system of claim 1, wherein the unmanned ground vehicle (UGV) further comprises:
   a UGV memory.

10. The system of claim 9, wherein the plurality of unmanned air vehicles (UAVs) directly transfer the set of digital images to the unmanned ground vehicle (UGV) for storage on the UGV memory.

11. The system of claim 1, wherein the set of commands, upon execution, causes at least one of the plurality of unmanned aerial vehicles (UAVs) to relocate to specified coordinates.

12. A computer-implemented method of capturing environmental data by an unmanned ground vehicle (UGV) in a specified location, the method comprising:
   receiving, via an antenna, a set of digital images from a plurality of unmanned aerial vehicles (UAVs), the set of digital images depicting a property located at the specified location;
   transmitting, to a remote server via a communication network, the set of digital images and a set of sensor data comprising at least one of: temperature data, pressure data, wind data, gas data, radioactivity data, and radiation data, the remote server configured to analyze the set of digital images to determine damage to the property as depicted in the set of digital images;
   waiting for further instructions to capture additional data;
   in response to not receiving the further instructions to capture additional data, querying the remote server via the communication network to determine whether at least one of the plurality of UAVs and the UGV should capture the additional data based on the transmitted set of digital images and the set of sensor data;
   receiving, from the remote server, at least a portion of the set of digital images that were analyzed by the remote server; and
   concurrently displaying, in an interface, (i) the portion of the set of digital images, and (ii) for each digital image in the portion of the set of digital images, a textual description of the damage to the property determined by the remote server.

13. The computer-implemented method of claim 12, further comprising:
supplying power, via a docking platform, to respective batteries of the plurality of unmanned aerial vehicles (UAVs).

14. The computer-implemented method of claim 12, further comprising:
securing, via a docking platform, the plurality of unmanned aerial vehicles (UAVs) to the unmanned ground vehicle (UGV).

15. The computer-implemented method of claim 12, further comprising:
capturing, by a set of sensors, the set of sensor data in an area surrounding the unmanned ground vehicle (UGV).

16. The computer-implemented method of claim 15, wherein capturing the set of sensor data comprises:
detecting, by the set of sensors, at least one of: various chemicals, one or more heat sources, imaging data, and weather parameters.

* * * * *